United States Patent Office
3,407,176
Patented Oct. 22, 1968

3,407,176
POLYAMIDE-ACIDS AND POLYIMIDE FROM A MIXTURE OF DIANHYDRIDES
Donald F. Loncrini, Schenectady, N.Y., assignor to General Electric Company, a corporation of New York
No Drawing. Filed Feb. 14, 1966, Ser. No. 527,091
10 Claims. (Cl. 260—47)

ABSTRACT OF THE DISCLOSURE

Copolymer polyamide acids and polyimides are prepared from diamine compounds and anhydrides, at least one of the anhydrides having aromatic ester groups.

---

This invention relates to new and useful resinous compositions. More particularly, it relates to useful copolymer compositions derived from diamino compounds and dianhydrides, at least one of said anhydrides containing aromatic ester groups and being present in the amount of from 25 mole percent to 75 mole percent of the total anhydride.

With the continual emphasis on more efficient equipment such as electrical apparatus with attendant elevated operating temperatures, there has developed a corresponding demand for resinous compositions such as electrical insulation and other polymer structures which will withstand such temperatures.

A principal object, therefore, of this invention is to provide polyamide acid compositions and their corresponding polyimides which are particularly suited for high temperature operation, as electrical insulation, protective coating materials, varnishes, adhesives, films, fibers and other structures.

The polymers of the present invention are conveniently prepared by reacting at room temperature for about one hour essentially equal molar proportions of diamines and mixtures of dianhydrides, at least one of which contains an ester moiety whereby soluble, high molecular weight, linear polyamide acids are formed. Polymers of varying molecular weights can be obtained by varying somewhat the proportions of dianhydride and diamine. Just as more than one dianhydride is used, so may more than one diamine be employed in connection with the invention. The viscous polyamide acid solutions resulting from the reaction of the ingredients can be cast or formed in the usual manner in the shape of films, spun into fibers or prepared in other well known forms. The polyamide acid material is then conveniently converted to the insoluble state as by heat treatment at temperatures preferably at least 200° C. to yield tough, flexible, thermally stable polyimide products. The melting points of films formed from these materials are generally above 400° C. and in many cases above 500° C. The polyimides additionally are noninflammable and are useful as electrical insulation in the form of tapes in the polyamide acid form which is later converted to the polyimide and find wide use as wire enamels, varnishes, adhesives and the like. Cast or molded structural parts can also be prepared from these materials.

Those features of the invention which are believed to be novel are set forth with particularity in the claims appended hereto. The invention will, however, be better understood and further objects thereof appreciated from a consideration of the following description.

The ester containing polyanhydrides which have been found to be useful in conjunction with the present invention are those described in Patents 3,182,073 and 3,182,074, said patents being included by reference herein. Such polyanhydrides can be expressed by the general formula (I) 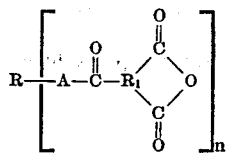

in which A can be oxygen, NH, sulfur and the like, n is at least 2 and R is an aromatic, alicyclic, saturated or unsaturated aliphatic or heterocyclic radical which can be unsubstituted or substituted with other groups such as haolgen, nitro, keto and the like. Exemplary of the aromatic radicals are those selected from the group having the following formula

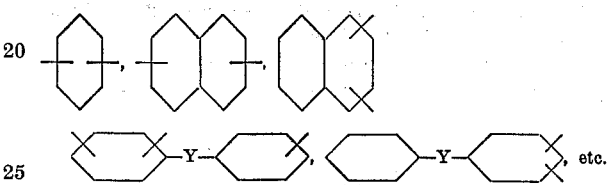

where Y represents a divalent radical selected from the group consisting of:

$$O, -\overset{O}{\underset{}{S}}-, -\overset{O}{\underset{O}{S}}-, -N=N-, -N=\overset{\uparrow}{N}-,$$

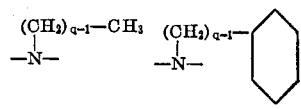

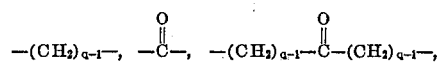

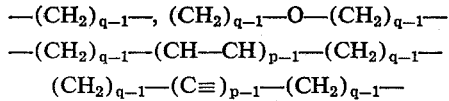

where $q$ is a positive integer of from 1 to 15.

Also useful are the divalent radicals of hydroquinone; resorcinol; dihydroxy naphthalene, dihydroxybiphenyl; 2,2 - bis(p - hydroxyphenyl) propane; dihydroxybenzophenone; methyl hydroquinone; chlorohydroquinone; phloroglucinol; trihydroxy naphthalene; p-hydroxy aniline; diamino benzene; p-hydroxythiophenol, etc. In the alicyclic series, R can be the divalent radical derived from cyclohexane; cyclobutane, cyclopentane, and the like. In the aliphatic series, R can be —(CH$_2$)$_{q-1}$—, (CH$_2$)$_{q-1}$—O—(CH$_2$)$_{q-1}$—
—(CH$_2$)$_{q-1}$—(CH—CH)$_{p-1}$—(CH$_2$)$_{q-1}$—
(CH$_2$)$_{q-1}$—(C≡)$_{p-1}$—(CH$_2$)$_{q-1}$— etc.

where $q$ is a positive integer from 1 to 15 and $p$ is a positive integer from 1 to 5, and is typified by the residue of ethylene glycol, diethylene glycol, polyethylene glycol, neopentyl glycol, 2,2-dibromo methyl-1,3-dihydroxy propane, 1,4-dihydroxyhexane, ethylene diamine, ethanol amine, glycerol, sugars, and the like. In the heterocyclic series, R can be the di-, tri- or polyvalent residue radicals of dihydroxy pyridine, dihydroxy carbazole, diamino pyridine, etc. R can also be a di- or polyvalent metal such as Fe, Cu, Zn, Al, alkaline earth, etc., organometallic,

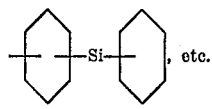, etc.

etc.

When R is divalent, the polyanhydride can be also expressed by the formula (II)
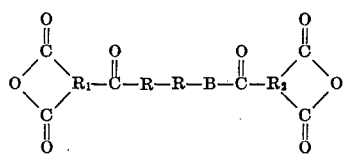

where B is the same as A above or different within this definition and $R_1$ and $R_2$ can be di-, tri-, or polyfunctional aromatic radicals such as phenyl, naphthyl, phenanthryl, etc., or aliphatic radicals such as propyl, butyl, pentyl, hexyl, octyl, decyl, etc., two of the carboxy groups being adjacent to form the anhydride, paraphenylene-bis(trimellitate)dianhydride,
neopentyl glycol-bis-trimellitate anhydride,
2,2-bis(p-trimellitoxy phenyl)propane dianhydride,
pentaerythrityltetra(trimellitate)tetra-anhydride,
glyceryltris(trimellitate)dianhydride,
p,p'-phenylene-bis(trimellitamide)dianhydride,
paraphenylene(trimellitoxy, trimellitamide)dianhydride,
ethylene-bis(trimellitate)dianhydride,
zinc-bis(trimellitate)dianhydride,
cupric-bis(trimellitate)dianhydride,
diphenyl silyl-bis(trimellitate)dianhydride,
paraphenylene-bis(3,4-dicarboxylic anhydride)butyrate,
ethylene-bis(trimellitamide)dianhydride,
1,1,1-tris(trimellitoxy methyl)ethane trianhydride.

The additional anhydrides useful in conjunction with this invention may be expressed by the following formula:

(III)
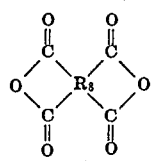

where $R_8$ is a tetravalent organic radical containing at least two carbon atoms selected from substituted and unsubstituted aliphatic, cycloaliphatic, heterocyclic, aromatic and combinations of such groups. Among the anhydrides useful in this connection are pyromellitic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl) propane dianhydride,
bis(3,4-dicarboxyphenyl) sulfone dianhydride,
perylene 3,4,9,10-tetracarboxylic acid dianhydride,
bis(3,4-dicarboxyphenyl) ether dianhydride,
naphthalene-1,2,4,5-tetracarboxylic dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
bis(2,3-dicarboxyphenyl) methane dianhydride,
bis(3,4-dicarboxyphenyl) methane dianhydride,
benzene-1,2,3,4-tetracarboxylic diahydride,
pyrazine-2,3,5,6-tetracarboxylic dianhydride,
thiophene-2,3,4,5-tetracarboxylic dianhydride,
3,4,3',4'-benzophenone tetracarboxylic dianhydride,
etc.

The diamines useful in connection with the present invention correspond to the general formula (IV)        $H_2N-R_7-NH_2$ where $R_7$ is a divalent organic group such as an aliphatic, aromatic, heterocyclic or alicyclic group containing at least two carbon atoms, the two amino radicals being attached to separate carbon atoms of the divalent group. In general, any primary diamines of the above types are useful so long as they contain no other already reactive groups, such as amino groups which detract from the polyamide acid-producing reaction. Included among such diamines are benzidine, 4,4'-diamino diphenyl ether, 3,3'-dimethoxy-4,4'-diaminodiphenyl methane, metaphenylene diamine, paraphenylene diamine, ethylene diamine and others, including those set forth in U.S. Patent 3,179,614 and 3,179,635.

Solvent useful in connection with the present invention include the usual polar solvents, among which are N-methyl-2-pyrrolidone, N,N'-dimethylformamide, N,N'-di-methylacetamide, pyridine, dimethylsulfoxide, cresols, such as metacresols, etc., alone or in mixture with other nonpolar diluents, such as benzene and the like, the solvent system as a whole being essentially polar.

The following examples illustrate the practice of the invention but are not to be taken as limiting in any way.

Example 1

This example illustrates the use as the anhydride of 75 mole percent of an ester containing anhydride and 25 mole percent of another anhydride. To a mixture of 3.44 g. (0.0075 mole) of p-phenylene-bis(trimellitate) dianhydride and 1.98 g. (0.01 mole) of 4,4'-diaminodiphenyl methane in 33.8 g. of N-methyl-2-pyrrolidone there was added 0.55 g. (0.0025 mole) of pyromellitic dianhydride. The mixture was stirred for one hour at room temperature to yield a viscous copolyamide acid solution having an inherent viscosity of 0.81 as measured in a 0.5% concentration of the reactant solvent. A film was cast from the copolymer solution which, after heat treating for one hour at 100° C., one hour at 200° C., and one hour at 240° C., was tough and flexible. At room temperature the tensile strength of the film was 14,100 p.s.i., the tensile modulus was 322,000 p.s.i. and the percent elongation was 11.5.

Example 2

This example illustrates the use of a 50 mole percent of ester-containing polyanhydride and 50 mole percent of another anhydride as the anhydride constituent. To a mixture of 1.09 g. (0.005 mole) of pyromellitic dianhydride, 2.0 g. (0.01 mole) 4,4'-diaminodiphenyl ether in 48.4 g. of N-methyl-2-pyrrolidone, there was added 2.29 g. (0.005 mole) of p-phenylene-bis(trimellitate) dianhydride. The mixture was stirred for one hour at room temperature to provide a copolyamide acid solution having an inherent viscosity of 1.36 as measured in a 0.5% solution of the reactant solvent. A film cast from the solution was tough and flexible. After heat treating as in Example 1, at room temperature, the film had a tensile strength of 14,300 p.s.i., a tensile modulus of 299,000 p.s.i. and in elongation of 10.2%.

Example 3

This example illustrates the preparation of a material using 25 mole percent of an acid-containing anhydride and 75 mole percent of another anhydride as the anhydride reactant. There was reacted with stirring for hour at room temperature a mixture of 1.145 g. (0.0025 mole) of p-phenylene-bis(trimellitate) dianhydride, 1.635 g. (0.0075 mole) of pyromellitic dianhydride, 1.08 g. (0.01 mole) meta-phenylene diamine and 21.94 g. of N-methyl-2-pyrrolidone. The inherent viscosity of the resulting copolymer was 0.54 as measured in a 0.5% concentration of the reactant solvent. A film was cast from the copolymer solution onto a glass plate, the film being heat-treated (as in Example 1). The cured film was tough and flexible.

Example 4

This example illustrates the present invention using as the anhydride 75 mole percent of an ester containing anhydride and 25 mole percent of another anhydride. A copolymer was prepared as in Example 1 except that 0.705 g. (0.0025 mole) of 3,4,3',4'-benzophenone dianhydride was substituted for the pyromellitic dianhydride and metaphenylene diamine was used in lieu of the 4,4'-diaminodiphenyl methane. The inherent viscosity of the resulting polyamide acid in a 0.5% solution of the reactant solvent was 0.45. When a film was cast from the solution and cured as in Example 1, the room temperature tensile strength was 16,800 p.s.i., the tensile modulus was 373,000 p.s.i. and the elongation was 14.5%.

Example 5

This example also illustrates the preparation of the present materials from an anhydride combination containing 50 mole percent of an ester-containing anhydride in 50 mole percent of another anhydride. Example 2 was repeated except that 1.61 g. (0.005 mole) of 3,4,3',4'-benzophenone dianhydride was used in lieu of the pyromellitic dianhydride and 1.98 g. (0.01 mole) of 4,4'-diaminodiphenyl methane was used in lieu of the 4,4'-diaminodiphenyl ether of the above example. The resultant copolyamide acid had an inherent viscosity of 0.94 as measured in a 0.5% concentration of the reactant solvent and a film laid down and heat-treated as in Example I had a room temperature tensile strength of 15,500 p.s.i., a tensile modulus of 260,000 p.s.i. and a percent elongation of 14.3.

Example 6

There was reacted together for one hour at room temperature with stirring a mixture of 1.145 g. (0.0025 mole) of p-phenylene-bis(trimellitate)dianhydride, 2.415 g. (0.0075 mole) of 3,4,3',4'-benzophenone dianhydride and 2.0 g. (0.01 mole) of 4,4'-diaminodiphenyl ether in 31.54 g. of N-methyl-2-pyrrolidone. The resultant copolyamide acid had an inherent viscosity of 0.99 as measured in a 0.5% solution of the reactant solvent. A film laid down on glass and heat treated as in Example 1 had at room temperature a tensile strength of 15,600 p.s.i., a tensile modulus of 337,000 p.s.i. and an elongation of 11.1%.

In addition to finding use as tough, flexible films as such, the present materials are useful as wire coatings and in other coating applications. They can also be made in the form of fibers and other useful structural forms. The materials are particularly characterized by their resistance to elevated temperatures, their physical integrity and excellent dielectric properties.

What I claim as new and desire to secure by Letters Patent of the United States is:

1. Polymeric-polyamide acid consisting of at least one anhydride having the formula (I) 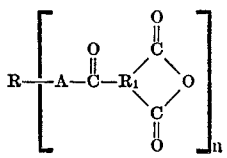

where A is oxygen, NH, or sulfur, n is at least 2, R is an aromatic, alicyclic, aliphatic or heterocyclic radical and $R_1$ is a polyfunctional organic radical containing at least two carbon atoms, and at least one anhydride having the formula (III) 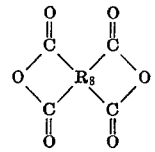

where $R_8$ is a tetravalent organic radical containing at least two carbon atoms, and at least one diamine having the formula (IV)
$$H_2N—R_7—NH_2$$

where $R_7$ is a divalent organic group having at least two carbon atoms.

2. A polymeric-polyamide-acid as in claim 1 wherein the anhydride of Formula I is present in the amount of from about 25 mole percent to 75 mole percent of the total anhydride.

3. A polymeric-polyamide-acid as in claim 1 wherein said anhydride of Formula I is paraphenylene-bis(trimellitate) dianhydride.

4. A polymeric-polyamide-acid as in claim 1 wherein said anhydride of Formula I is paraphenylene-bis(trimellitamide) dianhydride.

5. A polymeric-polyamide-acide as in claim 1 wherein said anhydride of Formula I is paraphenylene(trimellitoxy, trimellitamide) dianhydride.

6. A polymeric-polyamide-acid as in claim 1 wherein said anhydride of Formula I is 2,2-bis(-p-trimellitoxy phenyl) propane dianhydride.

7. A polymeric-polyamide-acid as in claim 1 wherein said anhydride of Formula III is benzophenone tetracarboxylic dianhydride.

8. A polymeric-polyamide-acid as in claim 1 wherein said anhydride of Formula III is pyromellitic dianhydride.

9. A polymeric-polyamide-acid as in claim 1 wherein said diamine is selected from the group consisting of benzidine, 4,4'-diaminodiphenyl ether, 3,3'-dimethoxy-4,4'-diaminodiphenyl methane, and phenylene diamine and mixtures thereof.

10. The polymeric polyimide heat reaction product of the polyamide-acid of claim 1.

References Cited

UNITED STATES PATENTS 3,264,250  8/1966  Gall _____ 260—32.6
3,277,117  10/1966  Van Strien _____ 260—346.3

WILLIAM H. SHORT, *Primary Examiner.*

LOUISE P. QUAST, *Examiner.*

L. LEE, *Assistant Examiner.*